Aug. 17, 1948.        N. TRBOJEVICH        2,447,104
VARIABLE LEVERAGE GEARING
Filed Aug. 30, 1944        2 Sheets-Sheet 1

INVENTOR.
Nikola Trbojevich

INVENTOR.
Nikola Trbojevich

Patented Aug. 17, 1948

2,447,104

UNITED STATES PATENT OFFICE 2,447,104

VARIABLE LEVERAGE GEARING

Nikola Trbojevich, Detroit, Mich.

Application August 30, 1944, Serial No. 551,851

15 Claims. (Cl. 74—462)

The invention relates to gearing of the variable leverage type comprising novel composite tooth curves.

Heretofore in constructing gearing of that type (mainly for use in automobile differentials) it was customary to rely upon a single tooth curve to provide an acceleration or deceleration and at the same time also to carry the contact over upon the adjacent tooth all at a variable velocity. I conceived the idea of separating the two functions by providing three sets of cooperating curves, one set to provide the variable leverage, another to carry over the maximum velocity to the next phase of contact at a constant ratio and still another to accomplish the same duty with regards to the minimum velocity. Kinematically speaking, the first set of curves has a line of action coinciding with the line of centers while the other two sets have lines of action transverse thereto.

I also discovered a mathematical method and formulas for exactly proportioning and timing the said various phases of the cycle, and also a method of uniting the said various curves tangentially to such an extent that they have the outward appearance of a single curve.

By this method of designing the tooth curves I also succeeded in eliminating the friction almost completely. The curves involved are logarithmic spirals and involute segments, the latter generated from two different base circles.

The object is to provide a variable leverage gear capable of furnishing a rapid and readily calculable acceleration and deceleration.

Another object is to provide a gear of the indicated type having desirable antifrictional qualities.

Another object is to provide a gear capable of operating at slightly varying center distances.

Other objects are to increase the relative depth of tooth, to reduce the minimum number of teeth in the pinion, and in the case of gear pumps, to increase the volume pumped during each revolution while at the same time reducing the sliding action to negligible proportions.

Figure 1:
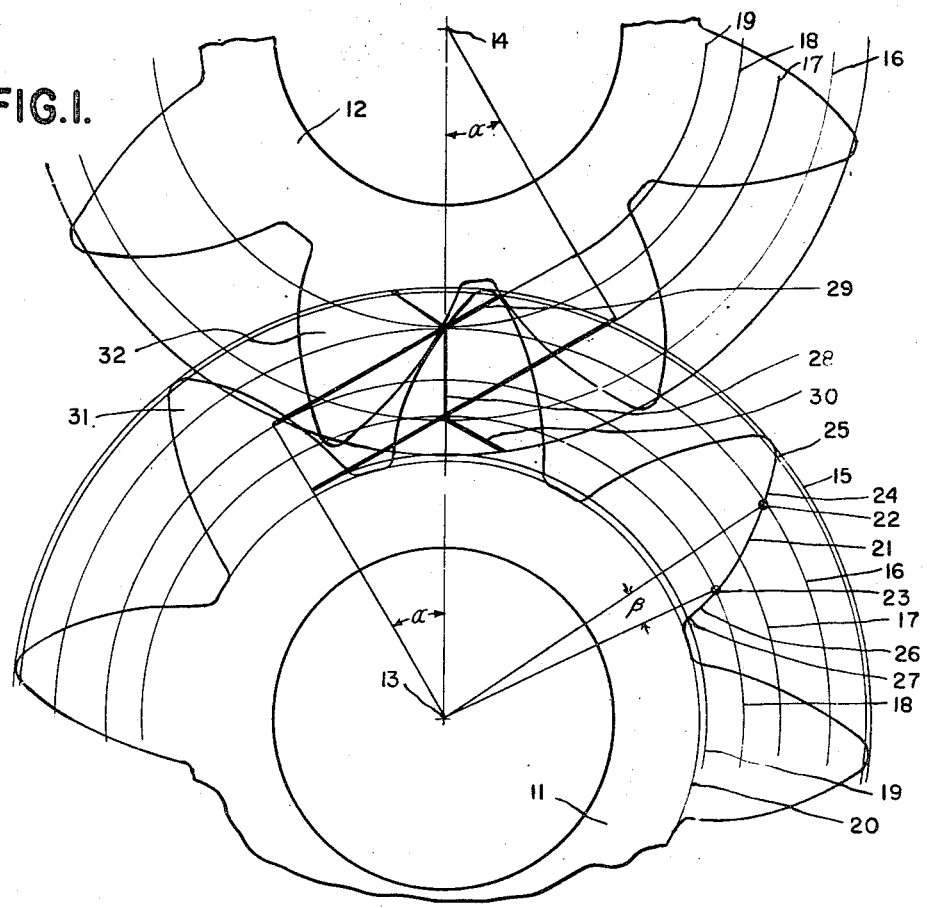
Figure 1 is a plan view of a meshing pair of spur gears provided with the new tooth curves.

As shown in Figure 1, two similar pinions 11 and 12 each having eight teeth are shown in mesh. It is to be understood however that the numbers of teeth do not have to be the same in two mating gears of this type as it will be further explained. The two axes of rotation 13 and 14 respectively are fixed as to center distance and about the first axis 13 an outside circle 15, an upper pitch circle 16, an upper base circle 17, a lower pitch circle 18, a lower base circle 19 and a root circle 20 are drawn. The tooth curves consist of a logarithmic spiral segment 21 lying between the points 22 and 23 of the pitch circles 16 and 18 respectively, an upper involute segment 24, a lower involute segment 26, the latter two tangentially extending from the said end points of the spiral outwardly and inwardly, a small rounded portion 25 at the outer corner of the segment 24 and a conjugate fillet 27 at the inner end of the segment 26 near the root of the tooth.

The line of action is an I-shaped configuration comprising a vertical line 28 lying in the line of centers between the said two pitch circles 18 and 16, a V-shaped pair of straight lines 29 at the top end and an inverted V-shaped pair of straight lines 30 at bottom end of the said vertical line 28. The said two pairs of lines are the lines of action of the respective involute segments 24 and 26 and as such are tangent (when prolonged) to the corresponding cooperating base circles 17 and 19 in each gear. Their active portions extend from the shank 28 until the nearest outside circle 15 of either gear is intersected.

The tooth curves thus constructed at one side of the gear tooth 31 are copied at the opposite side of the said tooth symmetrically. The teeth are equally spaced about the axis 13 in a circle. The teeth 32 of the mating gear 12 are similarly formed in this particular example and will not be further described.

The theory of this invention will now be discussed.

Figure 2:
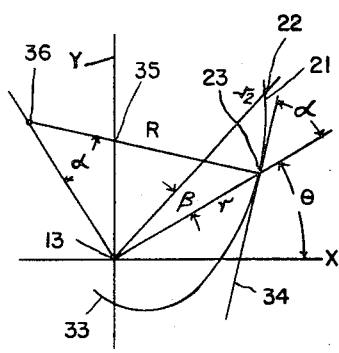
Figures 2 and 3 are geometrical diagrams explanatory of the Equations 1 to 6 inclusive.

In Figure 2 a logarithmic spiral 33 having a pole 13 is plotted in relation to a rectangular system of coordinates XY and also a polar system $r\theta$, both systems having a point of origin at the said pole.

The polar equation of the spiral 33 is:

$$r = e^{m\theta} \quad (1)$$

in which $e$ is the base of natural logarithms 2.7183 and $$m = \cotan\alpha \quad (2)$$

in which $\alpha$ denotes the constant pressure angle of the spiral, that is, the angle formed by the radius vector $r$ and the tangent 34 drawn at the point of intersection 23 of the spiral. The normals 35 also intersect the said radii vectors at a constant angle complementary of $\alpha$. The center 36 of the momentary curvature is found by intersecting the said normal 35 with the line 13—36 perpendicular to $r$ at the origin. The radius of curvature R is numerically equal to:

$$R = \frac{r}{\sin \alpha} \quad (3)$$

The value of the central angle $\beta$ corresponding to a spiral segment 21 extending between the points 23 and 22 (see also Figure 1) is obtained by solving the Equation 1 for $\theta$:

$$\theta = \tan \alpha \text{ natlog } r \quad (4)$$

in which the abbreviation "natlog" means a natural or as is sometimes called, a hyperbolic logarithm. For the arc 22—23, limited by the corresponding vectors $r_2$ and $r_1$ $$\beta = \theta_2 - \theta_1 \quad (5)$$

and $$\beta = \tan \alpha \text{ natlog } \frac{r_2}{r_1} \quad (6)$$

Figure 3:
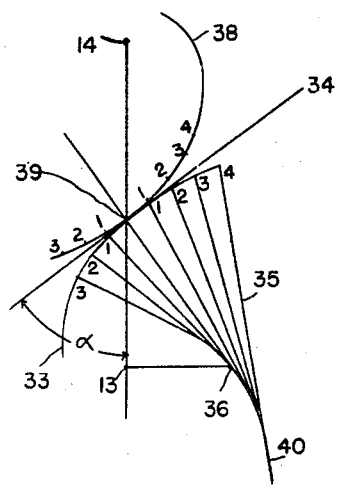

In Figure 3 two logarithmic spirals 33 and 38 respectively are shown contacting each other at the momentary point 39 in the line of centers 13—14. The common tangent 34 is always inclined relative to the said line of centers at a constant pressure angle $\alpha$. Due to this unique property of the logarithmic spiral it is possible to extend an arc of the said spiral by means of involute segments of the same pressure angle at both ends as was shown in Figure 1. When the two spirals 33 and 38 are held in contact and rotated either to the right or left, the momentary point of contact will travel up and down in the line of centers thus producing a "variable leverage" and the mating curves will roll one upon the other without sliding throughout their lengths. Another interesting property of the logarithmic spiral is that its evolute is another logarithmic spiral 40. Mathematical proofs for all these statements may be found in most textbooks on calculus and therefore will not be entered into in this description.

Figure 4:
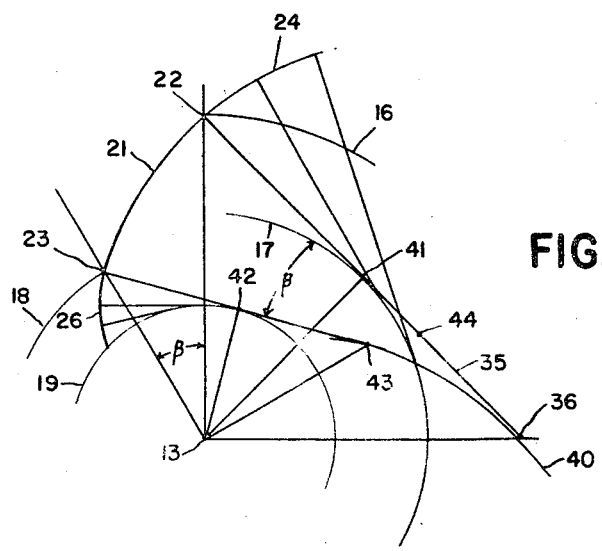
Figure 4 is a diagram explaining the method of aligning the spiral and involute segments.

In Figure 4 the method of forming a continuous tooth curve out of the logarithmic spiral segment 21' and two adjacent involute extensions 24 and 26 at its outer and inner ends respectively is illustrated. Two normals 22—36 and 23—43 are drawn at the corresponding termini of the said segment, the second numerals denoting the centers of curvature. From the pole 13 a larger base circle 17 and a smaller base circle 19 are drawn tangent to the said first and second normals, the points of tangency 41 and 42 being the respective momentary centers of curvature of the involute segments 24 and 26 at the points of juncture 22 and 23. It is to be noted that there is a discontinuity of second order in this method of splicing, i. e. the second differential quotients are discontinuous in the composite curve at the points of junction. For very exacting work the said discontinuity may be eliminated by gradually easing off the radius of curvature from its greater value 36—22 to the lesser value 41—21 by means of a suitable and preferably short transition curve having its center of curvature possibly at the point 44.

Figure 5:
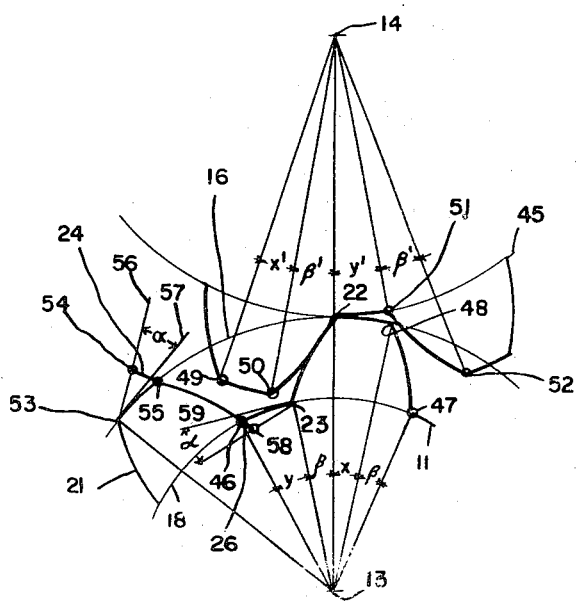
Figure 5 is a diagrammatic representation of two mating gears explanatory of the Equations 7 to 11 inclusive.

In Figure 5 the construction of two mating gears 11 and 45 having different numbers of teeth $n$ and $N$ and centers of rotation at the points 13 and 14 respectively is diagrammatically shown. In this system of gearing it is important that the timing of the various phases of engagement be correctly calculated as only in such a manner can a continuous engagement and a freedom of running be obtained. The calculation of the various periods, viz: acceleration, constant velocity, deceleration, another constant velocity and so on is best accomplished by first constructing the mating pitch lines of the two gears. In my Patent No. 1,869,528 of August 2, 1932, I showed that in variable velocity gearing the mating pitch lines must satisfy two requirements; first, the conjugate portions of two such lines must have exactly the same length of arc at every instant, and second the point of contact must always be in the line of centers. The logarithmic spiral used in this connection satisfies both of these requirements, therefore it becomes a part of the pitch line in this system. The top and bottom involutes on the other hand will be represented by the corresponding segments of the pitch circles.

The length of arc of a logarithmic spiral (denoted with $s$) extending between any two radii vectors $r_2$ and $r_1$ is determined from the equation:

$$s = \frac{1}{\cos \alpha}(r_2 - r_1) \quad (7)$$

It follows from the above equation that whenever a certain pressure angle $\alpha$ is adopted for all curves of the system the length of arc will depend only upon the difference in length of radii vectors, i. e. the depth of tooth and nothing else. Hence any segment whatever of a definite length cut out from such a spiral will mesh with any other segment cut out from a similar spiral of the opposite hand.

In Figure 5 the pitch line of the lower gear 11 is the broken line 46—23—22—48—47. This distance corresponds to a full cycle or one circular pitch. The sum of that cycle (in angles) is equal to:

$$x + y + 2\beta = \frac{2\pi}{n} \quad (8)$$

the quantity on the right side being equal to one complete tooth and space. A similar equation may be immediately written down for the upper gear 45:

$$x' + y' + 2\beta' = \frac{2\pi}{N} \quad (9)$$

The angles $\beta$ and $\beta'$ must be considered as known because from the data available they may be calculated from the Equation 6. It might be of interest to cite a few typical dimensions pertaining to the gear shown in Figure 1 which is drawn to scale in this connection. In that gear, the pressure angle is 30° and the accelerating period consumes 9° out of the available 45° (for eight teeth in the circle). The variable velocity consumes 40% and the constant velocity 60% of the time in each cycle.

The pitch line of the upper gear 45 is shown as the broken line 49—50—22—51—52. The circular segments of that line 49—50 and 22—51 are of exactly the same length as the mating segments in the gear 11. By denoting the inner and outer pitch radii of the gear 11 with $r_1$ and $r_2$ respectively and the center distance 13—14 with C, the following two equations may be written down based on the above explained consideration, viz:

$$r_1 y = (C - r_1) x' \quad (10)$$
$$r_2 x = (C - r_2) y' \quad (11)$$

The four Equations 8 to 11 inclusive, given above, contain four unknown quantities $x$, $y$, $x'$ and $y'$ which is sufficient data to find the values of all four.

It remains now to find the exact lengths of the involute segments 24 and 26. In Figure 5 at the left side, the top segment 24 has a length 55—54, th ending point 54 being the point of intersection of the said involute 24 with its line of action 53—54—56, the latter being inclined relative to the tangent 53—57 of the pitch circle at angle α.

A similar design is available for the lower involute segment 26. Its exact length 46—58 covers the span from the pitch line to the line of action 23—58. It is to be noted that the top involutes 24 lie entirely above the pitch circle 16 and the lower involutes 26 are below the circle 18. In this manner an interference with the operation of the mating spirals is avoided.

In Figure 1 the top of the tooth 31 was shown as being rounded off to a small radius 25 contacting a corresponding fillet 27 at the root of the mating tooth. This secondary bearing holds the gears together when there is no torque transmitted, e. g. during the decelerating period and prevents a clashing of the teeth.

This system of tooth curves is also applicable to bevel gears of the straight tooth type. The curves are transferred upon the back cones of the gears by the familiar Tredgold approximation in an entirely conventional way.

The calculation of sliding friction in this type of gearing may best proceed by analyzing the conditions set forth in Figure 1 by the peculiar I-shaped line of action 28—29—30. Inasmuch as all the points of contact are situated in the immediate proximity of their corresponding pitch points, it follows that the amount of sliding is unusually small.

It is also to be noted that a logarithmic spiral, similarly to an involute, will correctly operate at slightly varying center distances. This fact may be considered as an advantage.

What I claim as my invention is:

1. A pair of meshing variable velocity gears each having a plurality of equispaced teeth disposed in a circle and conjugate tooth curves formed on both sides of the said teeth, in which the said curves are constructed from three different curved segments tangentially merging one into another to form three concentric zones in each gear, the zones in one gear mating with the corresponding zones in the other gear in a timed relation, consecutively and independently of each other, in which the ratio of transmission in the inner and outer zones are two preselected constants, and the ratio in the middle zone is variable and is obtained by means of a shifting contact of the mating curves substantially in the line of centers throughout the said zone.

2. In variable velocity gearing, a tooth curve comprising three curved segments tangentially merging one into another, in which all three segments have ever-increasing radii of curvature as viewed outwardly from the axis of rotation, in which the first and third segments have ever-increasing pressure angles but substantially constant torque arms, the said arms being the shortest distances of the momentary normals of the curve from the said axis and in which the second or middle segment has substantially a constant pressure angle but a variable torque arm.

3. In variable velocity gearing, a tooth curve comprising three curved segments tangentially merging one into another in which the first and third segments correspond to involutes drawn from two different base circles and the middle segment corresponds to a logarithmic spiral.

4. A gear having an axis of rotation, two concentric pitch surfaces of rotation formed about the said axis, a plurality of equispaced and similar teeth disposed about the said surfaces to project therefrom outwardly and inwardly, continuous tooth curves on both sides of the said teeth so formed that the portions of the curves lying between the said two pitch surfaces are of such a curvature that their consecutive normals pass the said axis at an ever-increasing distance and the portions projecting inwardly and outwardly from the said surfaces have sets of normals so converging that they pass the said axis at substantially constant distances.

5. A gear of the general involute type having a plurality of equispaced teeth and tooth curves thereupon described by a point of a straight line when the said line rolls first over a smaller base circle, then over a logarithmic spiral segment and lastly over a larger base circle, the arrangement being such that the centers of the said circles and the pole of the said spiral are all at the same point and the said curves tangentially merge one into the other.

6. A mating pair of variable leverage gears having tooth profiles comprising curves of action and auxiliary profiles tangentially extending inwardly and outwardly therefrom, in which the said first curves contact each other with a rolling contact from end to end to produce a variable leverage and the auxiliary curves periodically engage each other substantially at two different constant velocity ratios for the purpose of continuing in contact at the last momentary ratio of either acceleration or deceleration until the next engagement of the said curves of action takes place.

7. A mating pair of variable leverage gears having tooth profiles comprising curves of action and auxiliary profiles tangentially extending inwardly and outwardly therefrom in which the said first curves engage each other substantially with a rolling action having a momentary point of contact shifting in the line of centers, and in which the auxiliary curves engage each other periodically between the said engagements of the first curves at two constant velocity ratios, substantially different from each other and in a line of contact extending transversely of the said line of centers.

8. A mating pair of variable leverage gears having tooth profiles comprising curves of action corresponding to arcs of logarithmic spirals and auxiliary profiles tangentially extending therefrom inwardly and outwardly corresponding to arcs of involutes.

9. A gear having a plurality of equispaced teeth disposed in a circle and capable of meshing with another similarly constructed gear or gears, in which the tooth curves are so formed that the working depth of the tooth is divided into three predetermined concentric zones each operating with a corresponding zone of the mating gear independently, intermittently and in a timed relation, the arrangement being such that the ratios of transmission are two constants substantially different from each other in the two outer zones and variable in the middle zone for the purpose of reducing the maximum width or span of the line of contact, to approximately one-third of what it otherwise would be for a similar sized gear constructed in a conventional manner.

10. Two meshing gears having a predetermined working depth in which the said depth is divided into a plurality of concentric zones of contact, in which the corresponding zones in the said two gears mesh with each other intermittently, in a timed relation and independent of each other, the arrangement being such that the ratios of transmission are alternately certain predetermined constants and variables in the consecutive zones, the arrangement being such that any point of junction of a variable and a constant velocity element the said elements are tangent to each other, and both have the same pressure angle and the same momentary velocity ratio.

11. A pair of meshing variable velocity gears in which each gear has a plurality of equispaced teeth, a plurality of segmented tooth curves formed thereupon and two concentric pitch circles dividing the said curves each into three segments, in which the inner and outer segments are conjugate constant velocity curved elements so formed that the corresponding ratios are substantially different from each other and from the nominal ratio obtained as the quotient of the corresponding numbers of teeth in the said two gears.

12. Two meshing variable velocity gears each having a plurality of teeth, a plurality of segmented tooth curves, one on each side of each said tooth and two concentric pitch circles dividing the said curves into three segments, in which the segments lying between the said two circles are logarithmic spirals and the inner and outer segments are involutes of the same pressure angle as the said spirals, whereby the gears are operable at variable center distances from each other.

13. A pair of meshing gears in which the relative angular velocities vary in cycles corresponding to the circular pitch of the gears, in which each cycle comprises four periods viz. a relatively minimum constant velocity, an acceleration, a relative maximum constant velocity and a deceleration period, in which the said four periods are obtained by employing two pitch circles in each gear whereby the momentary points of contact cross each of the said circles twice during each cycle and in which the distance between the said two pitch circles is so selected that the said two constant velocity periods consume more than one-half of the total cycle time.

14. A pair of variable velocity gears in which each gear has a plurality of equispaced teeth and a plurality of segmented tooth curves formed thereupon with respect to two concentric pitch circles in each gear, in which the segments lying between the said two circles are conjugate logarithmic spiral arcs correspondingly of the same pressure angle and length whereby the relative sliding between the said cooperating arcs is eliminated.

15. A gear having a plurality of equispaced teeth disposed about an axis, a plurality of segmented tooth curves formed upon the opposite sides of the said teeth and two concentric pitch circles intersecting the said curves in each gear, in which the radius of curvature of the segment lying between the said two pitch circles is substantially equal to the quotient formed by dividing the momentary radius vector by the sine of the angle formed by the said vector with the momentary tangent drawn to the curve at the point of intersection.

NIKOLA TRBOJEVICH.

REFERENCES CITED

The following references are of record in the file of this patent:

UNITED STATES PATENTS

| Number | Name | Date |
| --- | --- | --- |
| 2,009,915 | Davis | July 30, 1935 |
| 2,305,835 | Woods | Dec. 22, 1942 |
| 2,307,394 | Davis | Jan. 5, 1943 |
| 2,308,558 | Wildhaber | Jan. 19, 1943 |